(12) United States Patent
Newman et al.

(10) Patent No.: US 10,884,167 B2
(45) Date of Patent: Jan. 5, 2021

(54) HANDHELD PROJECTOR AND GAMING AID FOR TABLETOP GRID MAT

(71) Applicants: Clifford Newman, Bountiful, UT (US); Chris Canfield, Bountiful, UT (US)

(72) Inventors: Clifford Newman, Bountiful, UT (US); Chris Canfield, Bountiful, UT (US)

(*) Notice: Subject to any disclaimer, the term of this patent is extended or adjusted under 35 U.S.C. 154(b) by 0 days.

(21) Appl. No.: 16/038,097

(22) Filed: Jul. 17, 2018

(65) Prior Publication Data

US 2020/0025984 A1    Jan. 23, 2020

(51) Int. Cl.
*G03B 21/64* (2006.01)
*G02B 5/18* (2006.01)
*A63F 3/00* (2006.01)
*G03B 21/00* (2006.01)

(52) U.S. Cl.
CPC ........ *G02B 5/1819* (2013.01); *A63F 3/00643* (2013.01); *G02B 5/1828* (2013.01); *G02B 5/1842* (2013.01); *G03B 21/00* (2013.01); *G03B 21/64* (2013.01); *A63F 3/00145* (2013.01); *A63F 2003/00646* (2013.01)

(58) Field of Classification Search
CPC ............................... G03B 21/00; G03B 21/64
See application file for complete search history.

(56) References Cited

U.S. PATENT DOCUMENTS

| | | | | |
|---|---|---|---|---|
| 4,396,262 A | * | 8/1983 | Laizans | G03B 21/00 353/43 |
| 5,233,375 A | * | 8/1993 | Williams | G09F 19/18 353/43 |
| 5,550,610 A | * | 8/1996 | DeMarco | G03B 11/00 396/544 |
| 6,623,124 B2 | * | 9/2003 | Okura | G03B 21/14 353/101 |
| 8,684,557 B2 | * | 4/2014 | Totani | F21V 14/003 362/175 |

OTHER PUBLICATIONS

Dennis Scimeca, Dungeons and Dragons comes to life on digital maps, https://www.dailydot.com/parsec/digital-projected-tabletop-rpg-map/ (Year: 2015).*

* cited by examiner

*Primary Examiner* — Charlie Y Peng
(74) *Attorney, Agent, or Firm* — Steven Rinehart

(57) ABSTRACT

A handheld projector for visually defining an event zone on a grid mat of a tabletop game to obviate the need to manually make proximity calculations during game play to determine whether players indicated on a game board are located in sufficient proximity to a virtual event to be effected.

9 Claims, 9 Drawing Sheets

HANDHELD PROJECTOR AND GAMING AID FOR TABLETOP GRID MAT

BACKGROUND

Field of the Invention

This invention relates to projectors and table top games, and more particularly relates to electronic projectors for use in role playing games.

Description of the Related Art

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Tabletop games are well-known in the art in which several players participate in a game using a playing surface, grid mat, or board to visually indicate situational progress of the game. The game board, or grid mat, is often divided various board squares or sectors, sometimes within a larger labyrinth-shaped overlay, which sectors are sometimes octagonal. Often, large numbers of gaming aids are used in realizing game play, including figurines, dice, manuals, dioramas, modules, playing cards, and calculating devices. The dice add randomness to game play and provide some situational uncertainty to strategic decisions made by players during game play.

The squares, or sectors, on the board may designate virtual player proximity to situationally important events during game play, such explosions, action and violence which may inflict various levels of virtual damage on a player. There are numerous virtual events which may occur during game play. These virtual events often necessitate proximity calculations to determine the effect of the virtual event on players within the game, and to determine whether players indicated on a game board are located in sufficient proximity to the event to be effected, or within a damage zone (i.e., event zone). These virtual events quite often effect players within irregularly-shaped spaces or damage zones on the gird mat, including cone-shaped spaces, circle-shaped space, star-shaped space and the like. Examples of these virtual events include: fire ball explosions, laser beam blasts, arrows, swinging blades, traps, spells, and the like. It is time-consuming and tedious to constantly interrupt game play to calculate the area of irregularly-shaped damage zones on a game board within which a virtual event has effect, and there exists no means in the art or curing this inefficiency.

Examples of tabletop and role-playing games commonly requiring virtual event calculation include Dungeons & Dragons® by Wizards of the Coast, Pathfinder®, and numerous others.

There is no solution in the art to these inefficiencies. Accordingly, there exists a need in the art for a position indicator which solves these inefficiencies in the art. It is an object of the present invention to provide such a solution.

SUMMARY

From the foregoing discussion, it should be apparent that a need exists for a handheld gaming aid which projects an image onto a game board. Beneficially, such an apparatus would provide means of curing the deficiencies in the prior art described above, including facilitating visual identification of an event zone on a game board.

The present invention has been developed in response to the present state of the art, and in particular, in response to the problems and needs in the art that have not yet been fully solved by currently available apparati. Accordingly, the present invention has been developed to provide a handheld projector and tabletop gaming aid comprising: an outer housing defining two recesses: a circular projector beam recess and a rectangular viewfoil recess through which one more detachable viewfoils insert; an electronic projector for projecting a beam of light; one or more detachable viewfoils disposed between the projector and the projector beam recess, each viewfoil comprising a transparent sheet bearing an image consisting of an event zone defined only by a plurality of two dimensional sectors; wherein the image is exclusively associated with a virtual event occurring during gameplay; wherein, the image of the event zone is projected onto a grid mat of a tabletop game to visually define boundaries of an event zone on the grid mat.

The handheld projector may further comprise a carousel having a plurality of viewfoils, the carousel adapted to rotate axially within the projector.

The housing may be spherical for improved ergonomics. The handheld projector may further comprise a tripod for mounting the handheld projector.

The handheld projector, in some embodiments, further comprises a plurality of projectors, each projector disposed behind a detachable viewfoil.

A second handheld projector and tabletop gaming aid is provided comprising: an outer housing defining a circular projector beam recess; an electronic projector for projecting a beam of light; one or more viewfoils disposed between the projector and the projector beam recess, each viewfoil comprising an SLM having LCD adapted to display an image consisting of an event zone defined only by a plurality of two dimensional sectors; wherein the image is exclusively associated with a virtual event occurring during gameplay; wherein, the image of the event zone is projected onto a grid mat of a tabletop game to visually define boundaries of an event zone on the grid mat.

The housing may be spherical for improved ergonomics. The handheld projector may further comprise a tripod for mounting the handheld projector.

A third handheld projector and tabletop gaming aid is provided comprising: an outer spherical housing defining a circular projector beam recess; an electronic projector for projecting a beam of light; a viewfoil disposed between the projector and the projector beam recess, the viewfoil comprising an SLM having LCD adapted to display an image consisting of an event zone defined only by a plurality of two dimensional sectors; wherein the image is exclusively associated with a virtual event occurring during gameplay; wherein, the image of the event zone is projected onto a grid mat of a tabletop game to visually define boundaries of an event zone on the grid mat.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

It an object of the present invention to provide a novel, handheld gaming aid with projects an image defining an event zone onto a game board of the type commonly used in role-playing games such as Dungeons & Dragons®.

Figure 1:
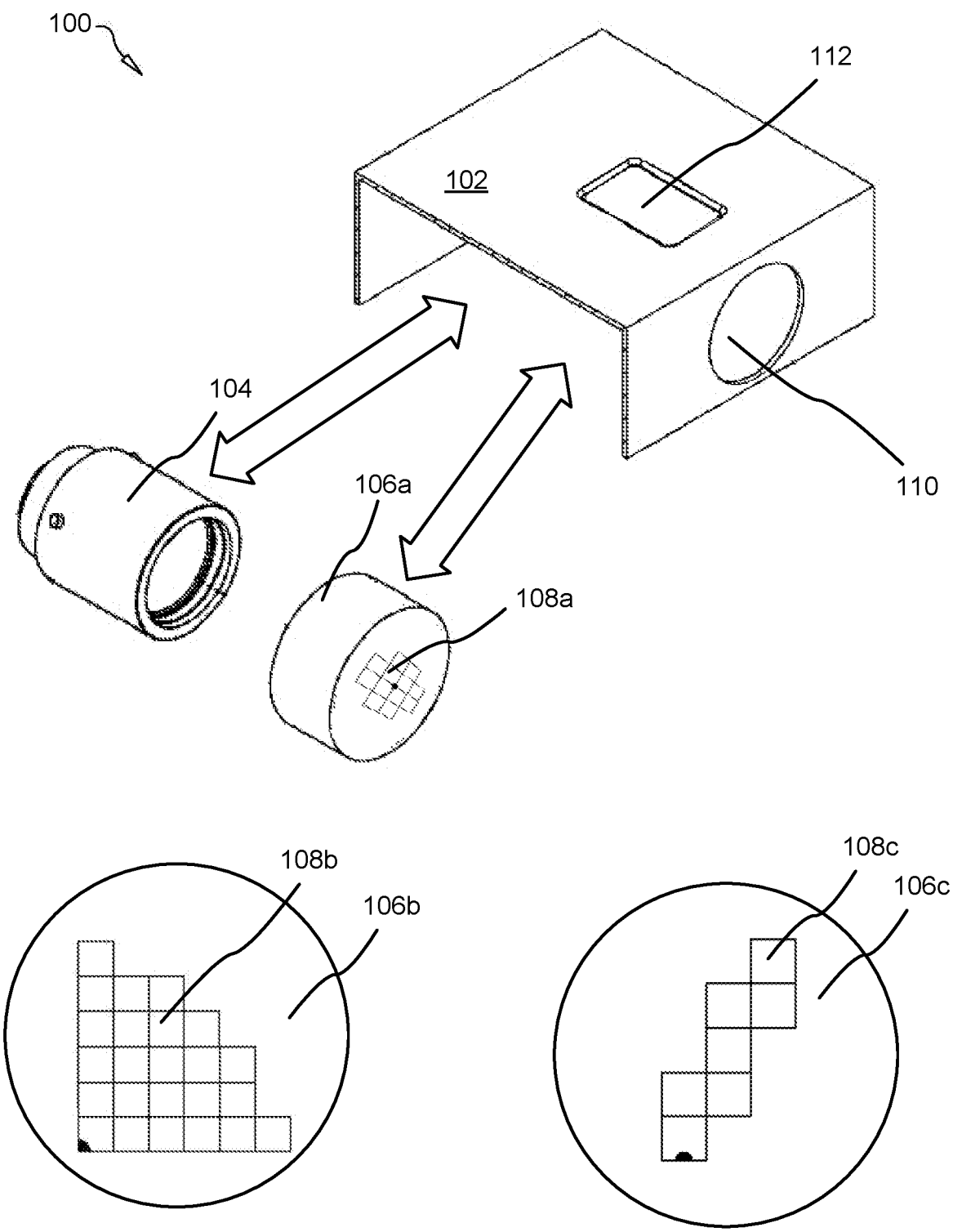
FIG. 1 is a front side perspective view of a disassembled handheld projector for a tabletop game board in accordance with the present invention.

FIG. 1 is a front side perspective view of a disassembled handheld projector 100 for a tabletop game board in accordance with the present invention.

The handheld projector 100 comprises a housing 102 made from polymeric or metallic components such as aluminum, nylon, titanium, steel, sheet metal, and the like using means known to those of skill in the art, including stamping and injection molding. The housing 102 defines a hollow interior, usually fully enclosed, recess for receiving the components necessary to impart projector function, including a projector 104, a power supply, and transceiver is some embodiments.

The housing 102 shown in cubic in shape, but may be cylindrical, helical, orbal, or any other shape. The handheld projector 102 defines two holes, recesses or apertures, a projector beam aperture 110 through which a projector 104 emits an image and viewfoil recess 112 for inserting one or more projection viewfoils 106.

The viewfoil 106 is positioned, in some embodiments, in the projection path of the projector 104, often between the projector 104 and the aperture 110. The viewfoil 106 may comprise a static image 108 imposed upon a transparent or translucent sheet such a cellulose acetate. The image 108 is projected onto a board to define an event zone on the board or grid mat.

In various embodiments, the viewfoil 108 comprises an electronic SLM (spatial light modulator) which digitally renders on an LCD or otherwise the image 108. The viewfoil 106 may comprise an LED array.

In various embodiments, the viewfoil 106 and projector 104 are integrated as single piece. The projector 104 may comprise an LED array pre-arranged to create the image 108. The handheld projector 100 is held above the board a distance calculated to conform sectors or grids apparent in the image with the size of sectors of grids on the game board.

Figure 2:
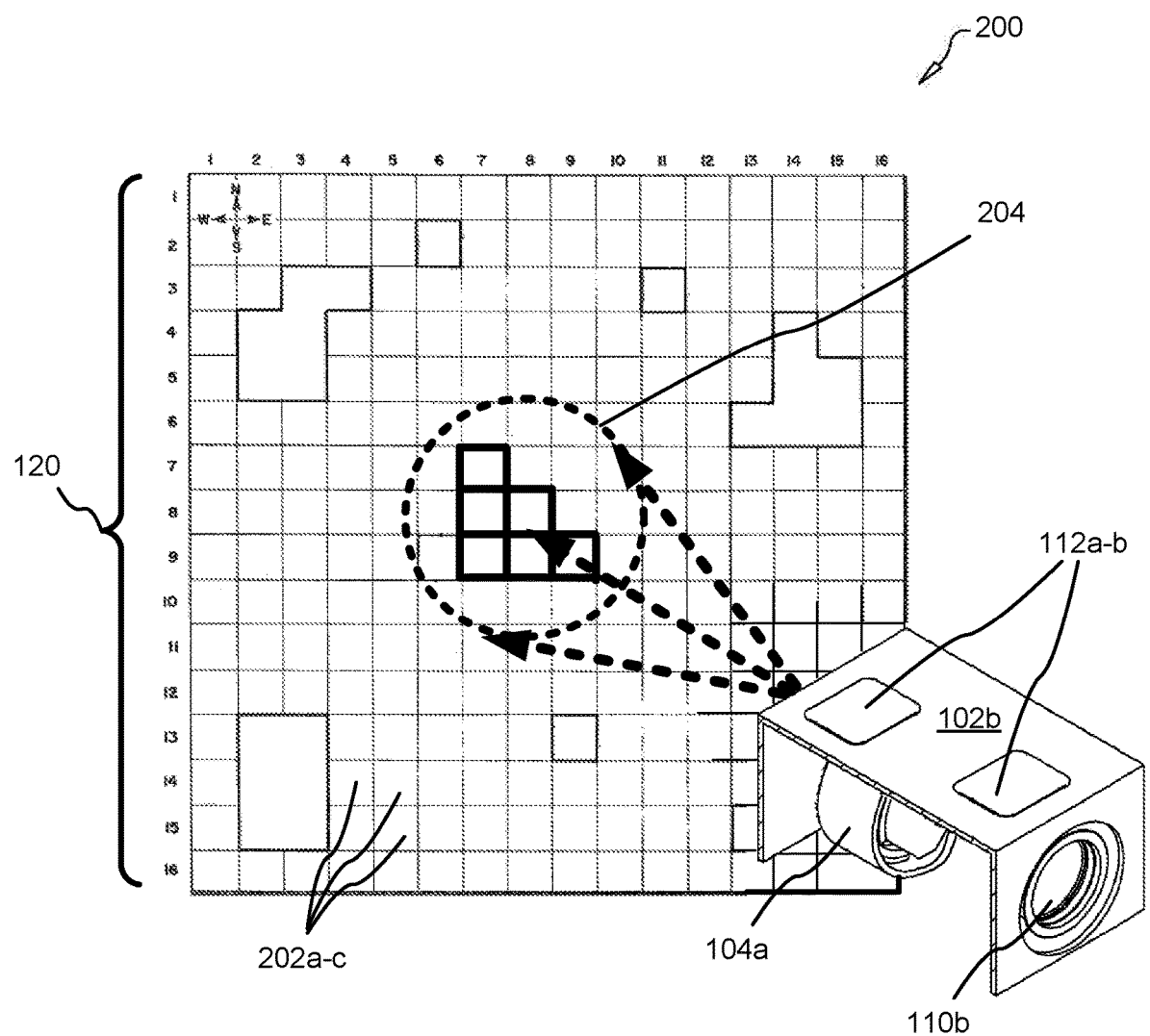
FIG. 2 is a side perspective view of a grid mat and handheld projector for a tabletop game board in accordance with the present invention.

FIG. 2 is a side perspective view of a grid mat and handheld projector 200 for a tabletop game board in accordance with the present invention.

As shown, the handheld projector 200 is suspended above the game board 120. The game board 120 comprises various squares or sectors 202a-c. Sectors in the image 108 are aligned with sectors on the board 108.

The handheld projector 200 as shown comprises a single projector 104a, but may comprise a plurality of projectors 104. As shown, the housing 102b defines a second aperture 110b through which a second projector 104 may project an image 204 onto the game board 120. The projector 200 may also define a second recess 112.

Alternatively, the handheld projector 200 may comprise a stereo slide projector for projecting images with differing polarizations to make the event zone appear in three dimensions to players of a tabletop game.

In some embodiments, a plurality of viewfoils 106 are disposed between the projector 104 and the projector recess 110.

Figure 3:
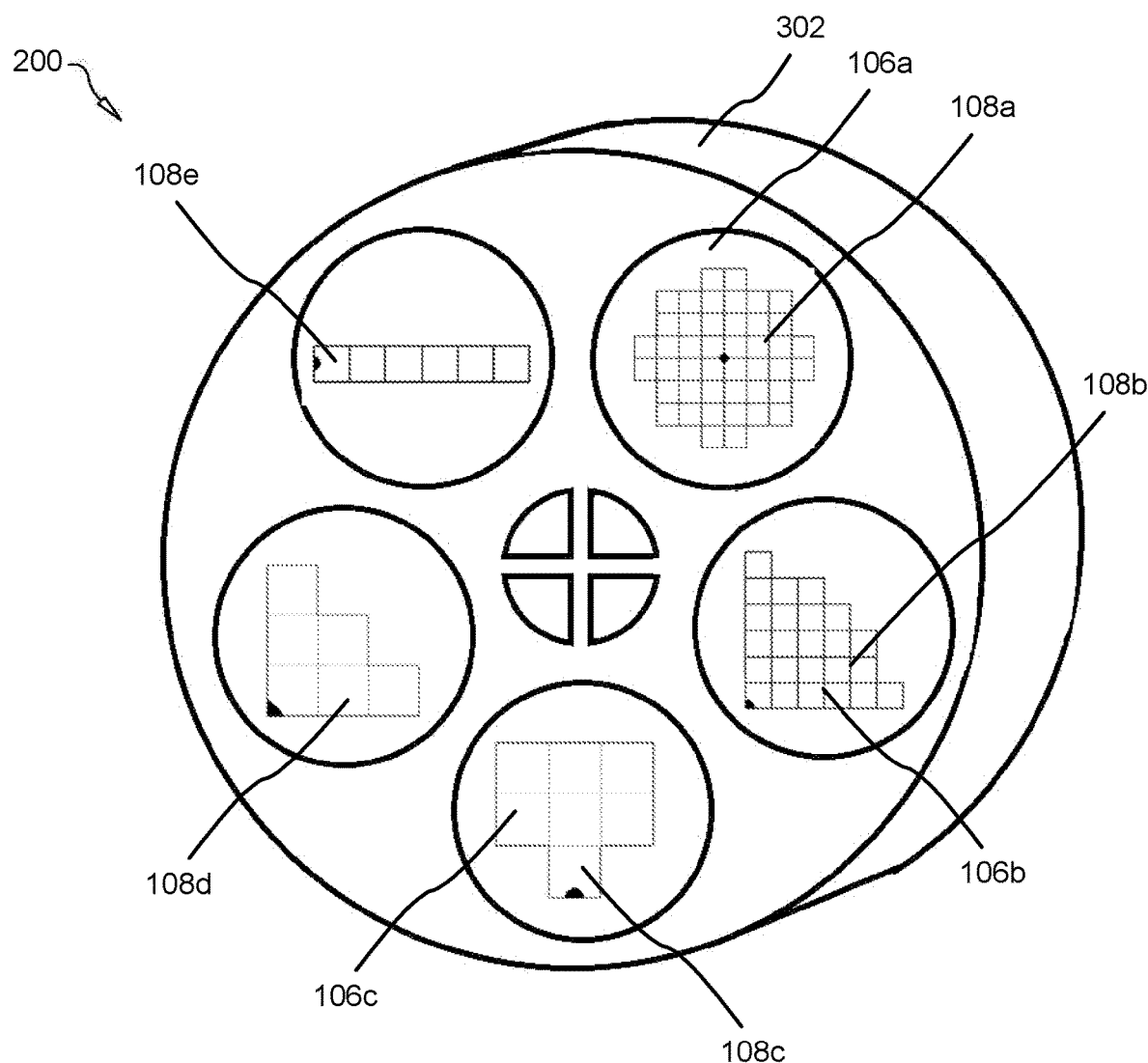
FIG. 3 is a front perspective view of the cylinder of a handheld projector and gaming aid for a tabletop game board in accordance with the present invention.

FIG. 3 is a front perspective view of the cylinder of a handheld projector 300 and gaming aid for a tabletop game board in accordance with the present invention.

The cylinder 300 features a carousel 302 which, in some embodiments, comprises a plurality of viewfoils 106. The cylinder 300 may insert into a projector 100, 200 and rotate axially within the projector 100, 200 to project a desired image. Each viewfoil 106 may comprise a different image 108.

Figure 4A:
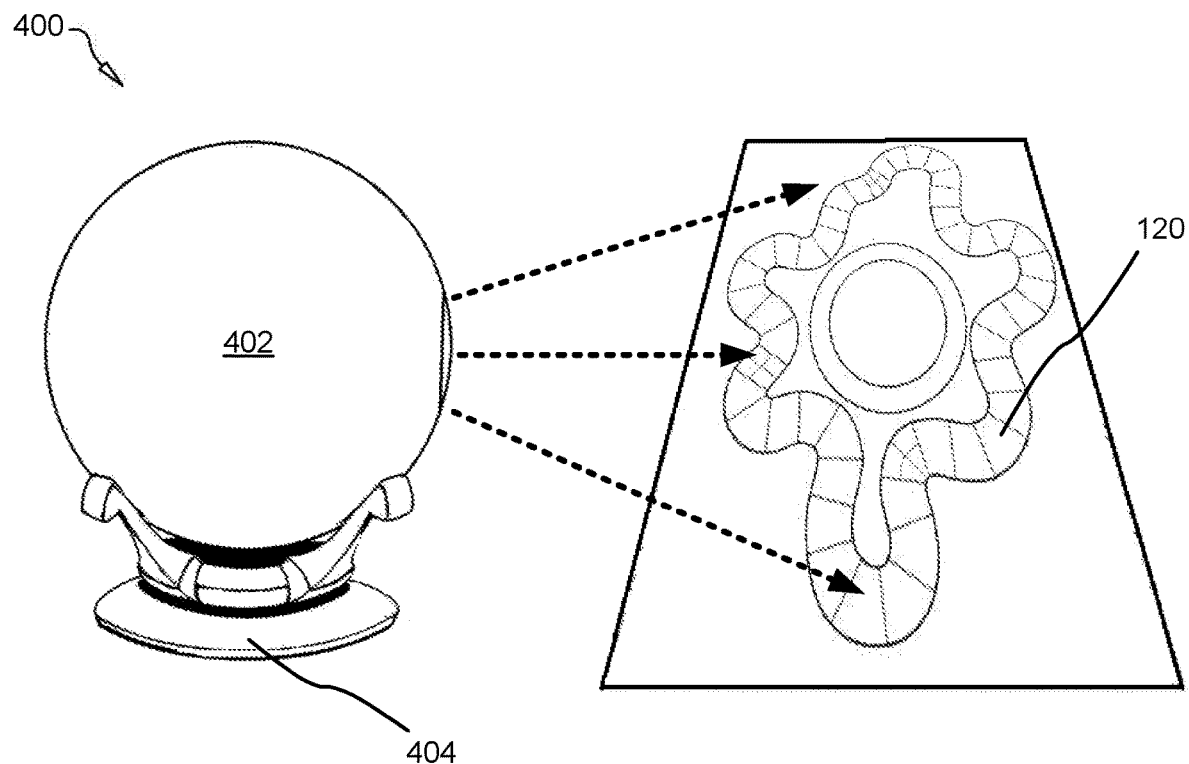
FIG. 4A is a front perspective view of an orb-shaped handheld projector and gaming aid for a tabletop game board in accordance with the present invention.

FIG. 4A is a front perspective view of an orb-shaped handheld projector 400 and gaming aid for a tabletop game board in accordance with the present invention.

The handheld projector 400 is orb-shaped or spherical to improve ergonomics in the shown embodiment and rests upon a tripod 404 stylized to conform aesthetically with the gameboard 120. The handheld projector 400 may comprise two hemispheres 454a-b mated together and form a hollow interior recess. The exterior surface of the projector 400 may be textured or knurled to improve its holdability by a player.

Figure 4B:
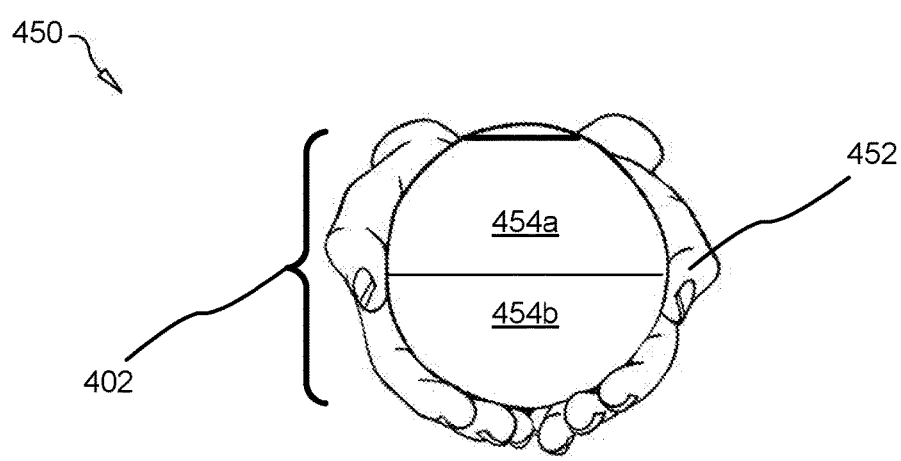
FIG. 4B is an environmental, front perspective view of an orb-shaped handheld projector and gaming aid for a tabletop game board in accordance with the present invention.

FIG. 4B is an environmental, front perspective view of an orb-shaped handheld projector 450 and gaming aid for a tabletop game board in accordance with the present invention.

As shown.

Figure 5:
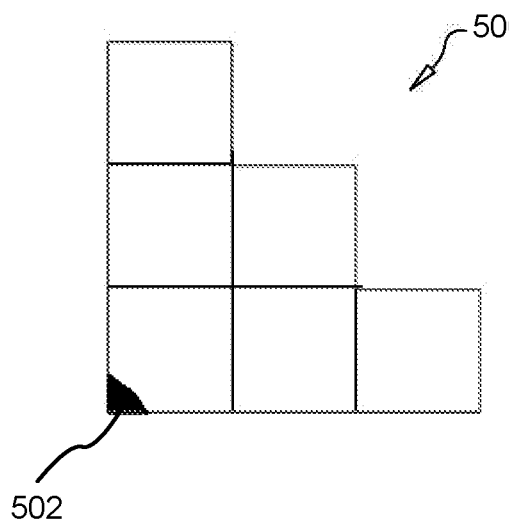
FIG. 5 is a top perspective view of a projection template of a handheld projector and gaming aid for a tabletop game board in accordance with the present invention.

FIG. 5 is a top perspective view of a projection template 500 of a handheld projector 500 and gaming aid for a tabletop game board in accordance with the present invention.

The shown template 500 is triangular-shaped and consists of six sectors as shown which define an event zone emanating from an event point indicated at 502. The template 500 shows a substantially conical event originated at point 502. The template 500 is three sectors wide and three sectors tall.

Figure 6:
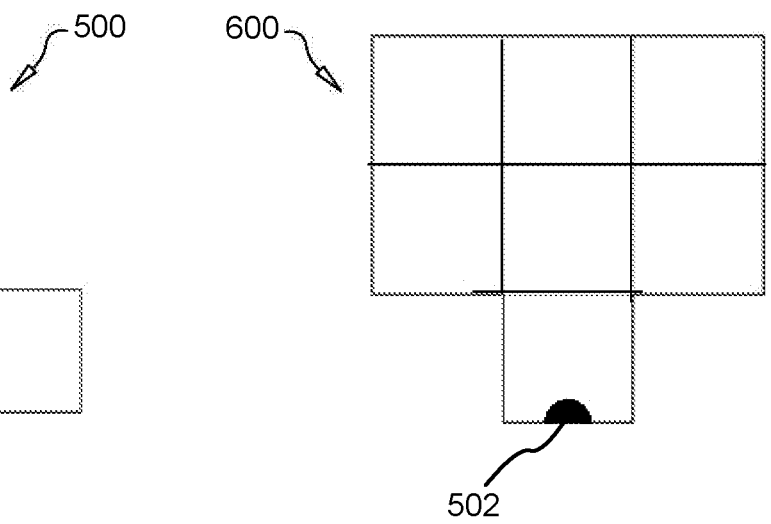
FIG. 6 is a top perspective view of a projection template of a handheld projector and gaming aid for a tabletop game board in accordance with the present invention.

FIG. 6 is a top perspective view of a projection template 600 of a handheld projector and gaming aid for a tabletop game board in accordance with the present invention.

The shown template 600 consists of seven sectors as shown which define an event zone emanating from an event point indicated at 502. The template 600 is three sectors wide and two sectors tall, with a final sector positioned and centered beneath the bottom row.

Figure 7:
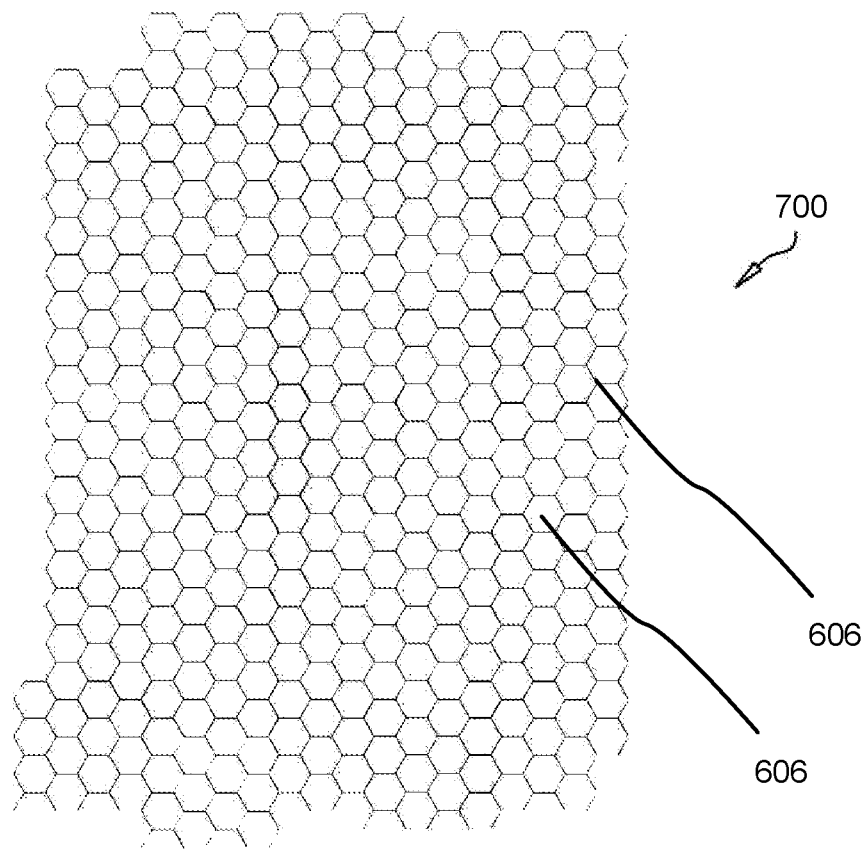
FIG. 7 is a top perspective view of a grid mat in accordance with the prior art.

FIG. 7 is a top perspective view of a grid mat in accordance with the prior art.

As shown the gameboard 700 may comprise hexagonal sectors 606 as shown. Sector breaks are indicated at 608.

Figure 8:
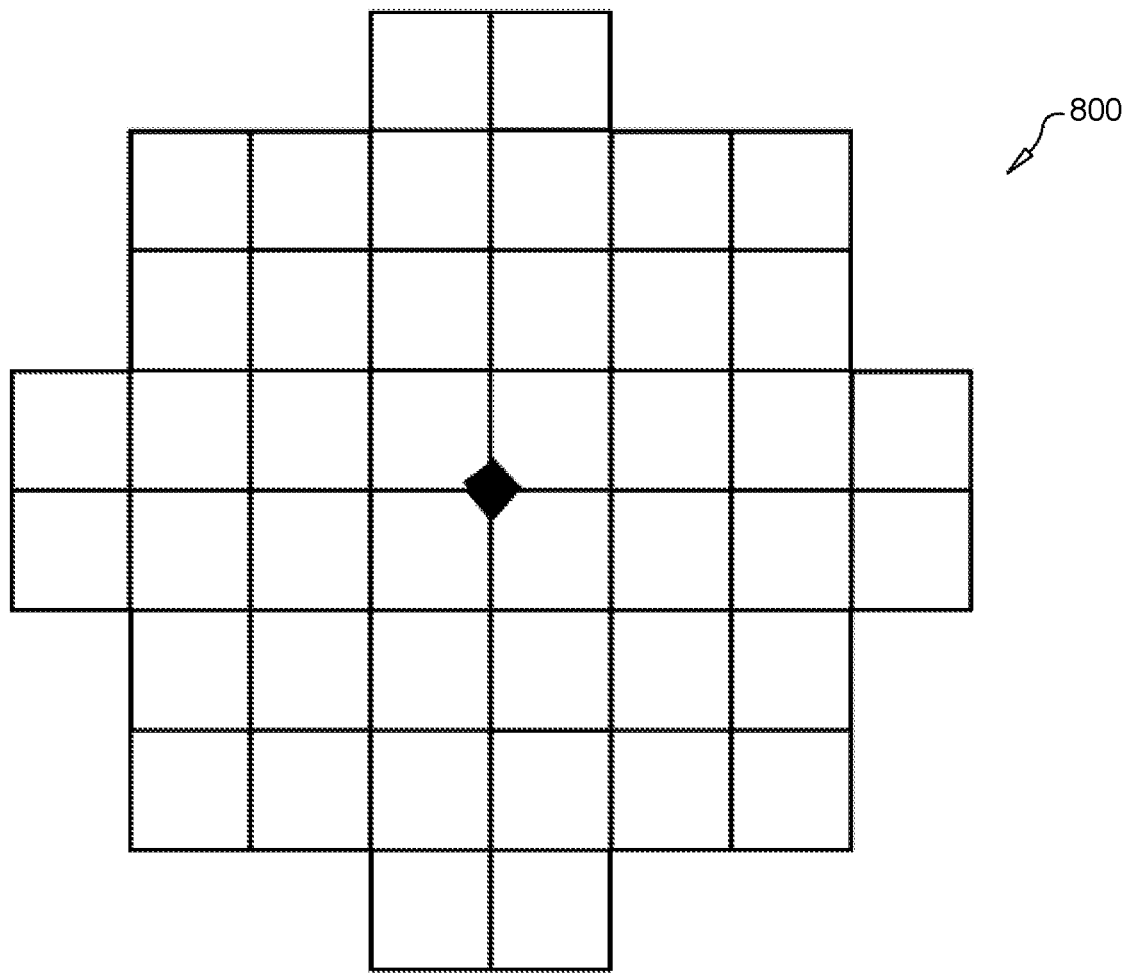
FIG. 8 is a top perspective view of a projection template of a handheld projector and gaming aid for a tabletop game board in accordance with the present invention.

FIG. 8 is a top perspective view of a projection template 800 of a handheld projector and gaming aid for a tabletop game board in accordance with the present invention.

The shown template 800 consists of forty-four sectors as shown which define an event zone emanating from an event point indicated at 502. The template 900 defines an event zone for a roughly circular event, such as a virtual blast or explosion.

Because the number of sectors in template 800 vastly exceed the number in template 500, the image 108 on the viewfoil 106 is necessarily smaller, meaning a player will have to hold the projector 100 projecting the template 800 at a higher distance above the board than with other templates.

Figure 9:
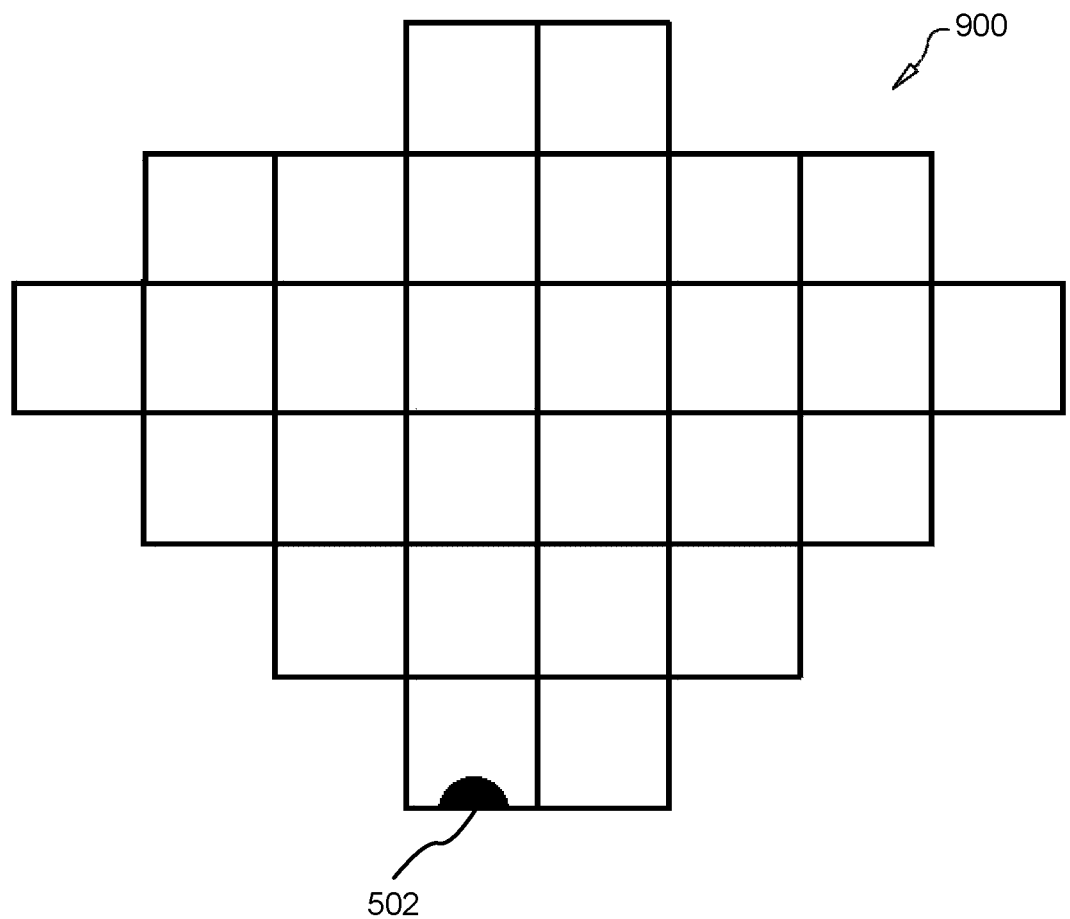
FIG. 9 is a top perspective view of a projection template of a handheld projector and gaming aid for a tabletop game board in accordance with the present invention.

FIG. 9 is a top perspective view of a projection template 900 of a handheld projector and gaming aid for a tabletop game board in accordance with the present invention.

The shown template 900 consists of thirty sectors as shown which define an event zone emanating from an event point indicated at 502.

Figure 10:
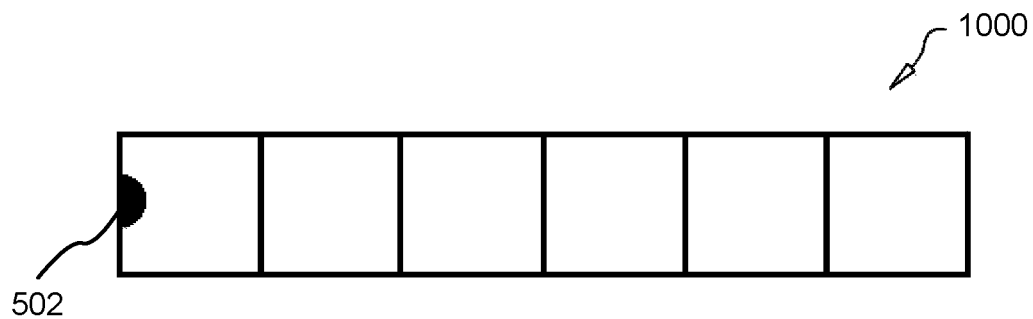
FIG. 10 is a top perspective view of a projection template of a handheld projector and gaming aid for a tabletop game board in accordance with the present invention.

FIG. 10 is a top perspective view of a projection template of a handheld projector and gaming aid for a tabletop game board in accordance with the present invention.

The shown template 1000 consists of six sectors as shown which define an event zone emanating from an event point indicated at 502, such as an arrow shot from a bow. The template 1000 is 1 sector tall and six sectors long.

Figure 11:
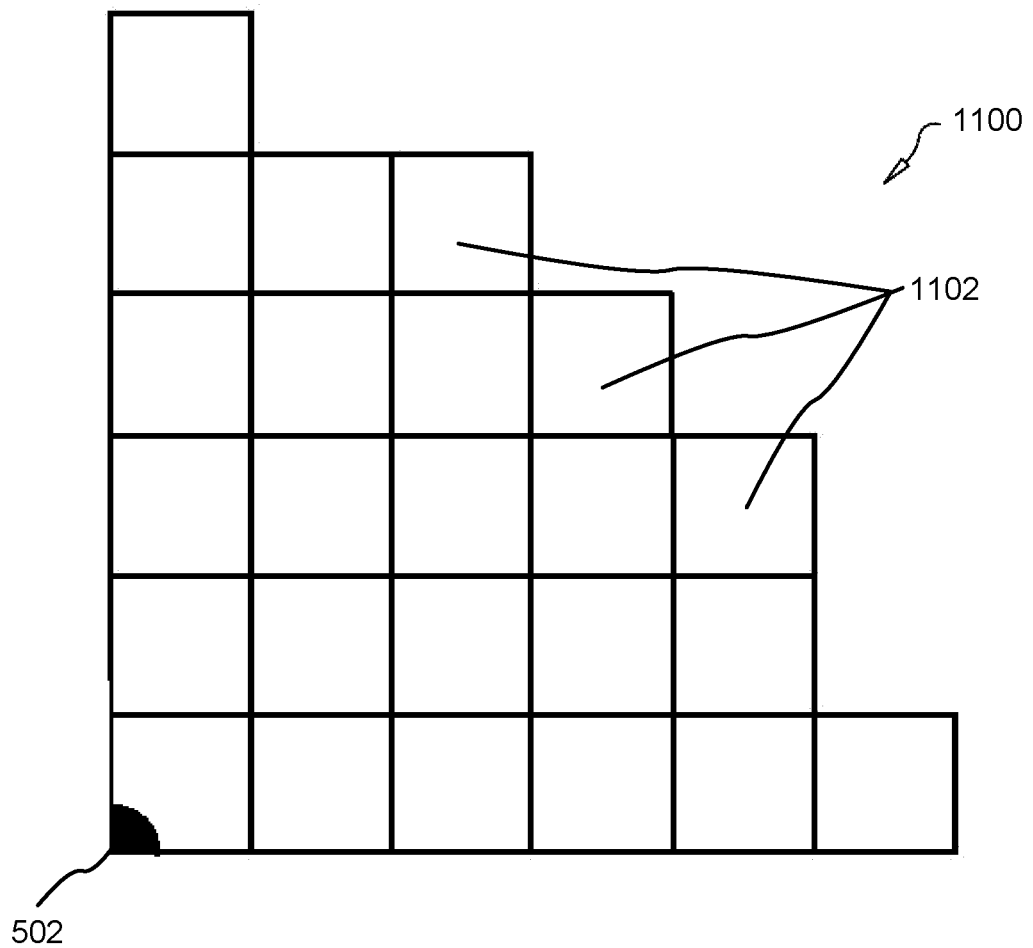
FIG. 11 is a top perspective view of a projection template of a handheld projector and gaming aid for a tabletop game board in accordance with the present invention.

FIG. 11 is a top perspective view of a projection template 1100 of a handheld projector and gaming aid for a tabletop game board in accordance with the present invention.

The shown template 1100 consists of twenty-three sectors as shown which define an event zone emanating from an event point indicated at 502. The template 1100 is six sectors tall and six sectors wide, forming a roughly triangular shape with the three additional sectors along the hypotenuse 1102 (formed by the three indicated sectors).

Figure 12:
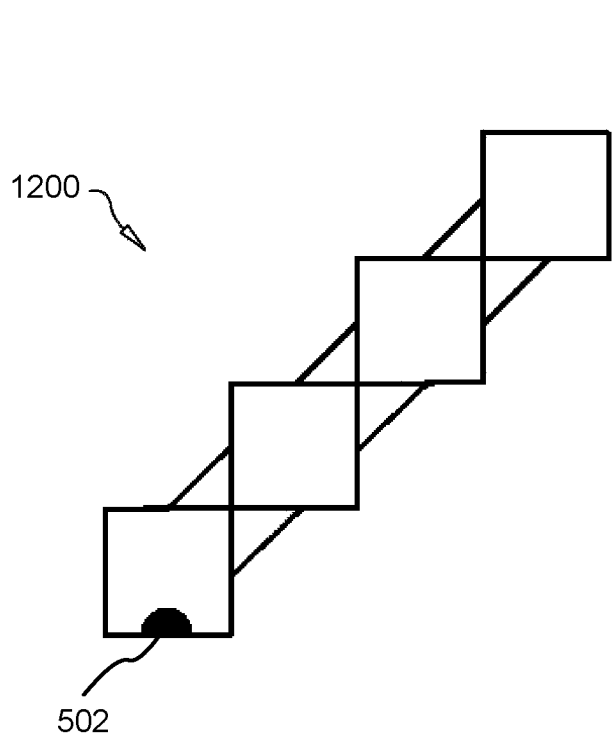
FIG. 12 is a top perspective view of a projection template of a handheld projector and gaming aid for a tabletop game board in accordance with the present invention.

FIG. 12 is a top perspective view of a projection template 1200 of a handheld projector and gaming aid for a tabletop game board in accordance with the present invention. The template 1200 comprises four sectors disposed in diagonal fashion.

The shown template 1200 consists of four sectors as shown which define an event zone emanating from an event point indicated at 502.

Figure 13:
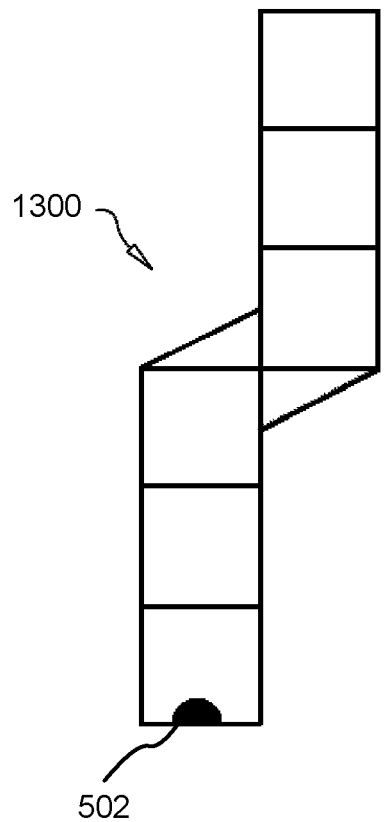
FIG. 13 is a top perspective view of a projection template of a handheld projector and gaming aid for a tabletop game board in accordance with the present invention.

FIG. 13 is a top perspective view of a projection template 1300 of a handheld projector and gaming aid for a tabletop game board in accordance with the present invention.

The shown template 1300 consists of six sectors as shown which define an event zone emanating from an event point indicated at 502. The template 1300 comprises two sections of four sectors each, where the sectors of the first set are no colinear with the sectors of the second set.

Figure 14:
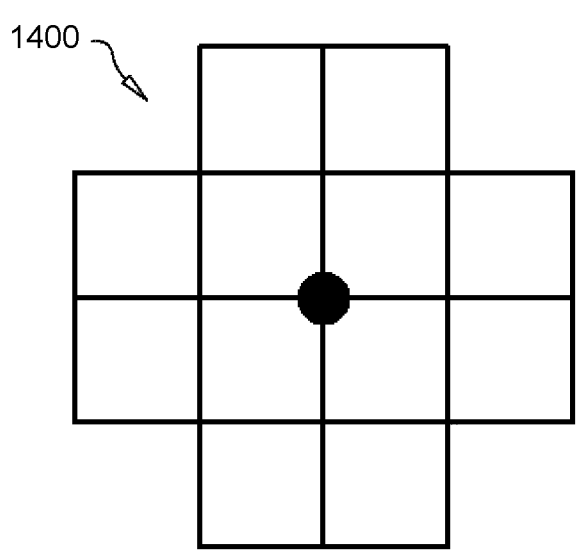
FIG. 14 is a top perspective view of a projection template of a handheld projector and gaming aid for a tabletop game board in accordance with the present invention.

FIG. 14 is a top perspective view of a projection template of a handheld projector and gaming aid for a tabletop game board in accordance with the present invention.

The shown template 1400 consists of eight sectors as shown which define an event zone emanating from an event point indicated at 502.

Figure 15:
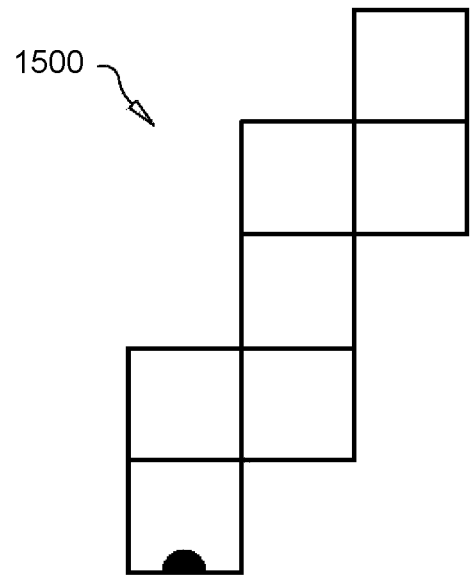
FIG. 15 is a top perspective view of a projection template of a handheld projector and gaming aid for a tabletop game board in accordance with the present invention.

FIG. 15 is a top perspective view of a projection template of a handheld projector and gaming aid for a tabletop game board in accordance with the present invention.

The shown template 1500 consists of seven sectors as shown which define an event zone emanating from an event point indicated at 502.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A handheld projector and tabletop gaming aid comprising:
    an outer housing defining two recesses: a circular projector beam recess and a rectangular viewfoil recess through which one or more detachable viewfoils insert;
    an electronic projector for projecting a beam of light;
    the one or more detachable viewfoils disposed between the projector and the projector beam recess, each of the one or more viewfoils comprising a transparent sheet bearing an image consisting of an event zone defined only by a plurality of two dimensional sectors;
    wherein the image is exclusively associated with a virtual event occurring during gameplay;
    wherein, the image of the event zone is projected onto a grid mat of a tabletop game to visually define boundaries of the event zone on the grid mat.

2. The handheld projector of claim 1, further comprising a carousel having the one or more detachable viewfoils, the carousel adapted to rotate axially within the projector.

3. The handheld projector of claim 1, wherein the outer housing is spherical for improved ergonomics.

4. The handheld projector of claim 1, further comprising a tripod for mounting the handheld projector.

5. The handheld projector of claim 1, further comprising a plurality of projectors, each projector disposed behind each of the one or more detachable viewfoils.

6. A handheld projector and tabletop gaming aid comprising:
    an outer housing defining a circular projector beam recess;
    an electronic projector for projecting a beam of light;
    one or more viewfoils disposed between the projector and the projector beam recess, each of the one or more viewfoils comprising an SLM having an LCD adapted to display an image consisting of an event zone defined only by a plurality of two dimensional sectors;
    wherein the image is exclusively associated with a virtual event occurring during gameplay;
    wherein, the image of the event zone is projected onto a grid mat of a tabletop game to visually define boundaries of the event zone on the grid mat.

7. The handheld projector of claim 1, wherein the outer housing is spherical for improved ergonomics.

8. The handheld projector of claim 1, further comprising a tripod for mounting the handheld projector.

9. A handheld projector and tabletop gaming aid comprising:
    an outer spherical housing defining a circular projector beam recess;
    an electronic projector for projecting a beam of light;
    a viewfoil disposed between the electronic projector and the projector beam recess, the viewfoil comprising an SLM having an LCD adapted to display an image consisting of an event zone defined only by a plurality of two dimensional sectors;
    wherein the image is exclusively associated with a virtual event occurring during gameplay;
    wherein, the image of the event zone is projected onto a grid mat of a tabletop game to visually define boundaries of the event zone on the grid mat.

\* \* \* \* \*